United States Patent
Wang et al.

(10) Patent No.: US 10,057,737 B2
(45) Date of Patent: Aug. 21, 2018

(54) SYSTEM AND METHOD FOR AUTOMATIC CALL SYNCHRONIZATION (71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Jiaheng Wang, Beijing (CN); Feng Bai, Beijing (CN); Jiuxia Yang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 54 days.

(21) Appl. No.: 15/129,417

(22) PCT Filed: Jul. 3, 2015

(86) PCT No.: PCT/CN2015/083269
§ 371 (c)(1),
(2) Date: Sep. 26, 2016

(87) PCT Pub. No.: WO2016/095499
PCT Pub. Date: Jun. 23, 2016

(65) Prior Publication Data
US 2017/0180958 A1    Jun. 22, 2017

(30) Foreign Application Priority Data

Dec. 19, 2014  (CN) .......................... 2014 1 0802949

(51) Int. Cl.
*H04W 4/16* (2009.01)
*H04M 3/54* (2006.01)

(52) U.S. Cl.
CPC ............... *H04W 4/16* (2013.01); *H04M 3/54* (2013.01)

(58) Field of Classification Search
None
See application file for complete search history.

(56) References Cited

U.S. PATENT DOCUMENTS

| 5,903,833 A * | 5/1999 | Jonsson | H04M 3/42263 |
| | | | 455/417 |
| 2004/0266350 A1* | 12/2004 | Kim | H04M 1/72502 |
| | | | 455/41.2 |

(Continued)

FOREIGN PATENT DOCUMENTS

| CN | 1713667 A | 12/2005 |
| CN | 101064755 A | 10/2007 |

(Continued)

OTHER PUBLICATIONS

English translation of International Search Report and Written Opinion dated Sep. 2, 2015, for corresponding PCT Application No. PCT/CN2015/083269.

(Continued)

*Primary Examiner* — Charles Appiah
*Assistant Examiner* — Frank Donado
(74) *Attorney, Agent, or Firm* — Kinney & Lange, P.A.

(57) ABSTRACT

The present disclosure discloses a system and a method for automatic call synchronization. When a mobile terminal receives a called signal from a calling mobile terminal and determines that an automatic call synchronization function is enabled by itself, the mobile terminal transmits, to a wireless signal transponder, a call synchronization request which carries identification information and call information of the mobile terminal; a mode recognition unit which is connected to the wireless signal transponder performs an authentication on the mobile terminal according to the identification infor- (Continued)

mation of the mobile terminal; and transmits a call access request which carries the identification information and the call information of the mobile terminal to the fixed terminal via the wireless signal transponder, after the authentication on the mobile terminal is passed.

17 Claims, 4 Drawing Sheets

(56) References Cited

U.S. PATENT DOCUMENTS

| | | | | |
|---|---|---|---|---|
| 2005/0215233 | A1* | 9/2005 | Perera | H04W 12/06 |
| | | | | 455/411 |
| 2009/0203330 | A1* | 8/2009 | Arimoto | H04M 1/73 |
| | | | | 455/90.2 |
| 2013/0035090 | A1* | 2/2013 | Moshfeghi | H04W 88/04 |
| | | | | 455/422.1 |
| 2013/0143529 | A1 | 6/2013 | Leppanen | |
| 2013/0183950 | A1 | 7/2013 | Hwang | |

FOREIGN PATENT DOCUMENTS

| | | |
|---|---|---|
| CN | 101345917 A | 1/2009 |
| CN | 102014349 A | 4/2011 |
| CN | 104410958 A | 3/2015 |
| CN | 104507063 A | 4/2015 |
| JP | 2007266927 A | 10/2007 |

OTHER PUBLICATIONS

First Chinese Office Action, for Chinese Patent Application No. 201410802949.3, dated Aug. 1, 2017, 12 pages.

English translation of Written Opinion dated Sep. 2, 2015, for corresponding PCT Application No. PCT/CN2015/083269.

Second Chinese Office Action, for Chinese Patent Application No. 201410802949.3, dated Dec. 26, 2017, 8 pages.

* cited by examiner

SYSTEM AND METHOD FOR AUTOMATIC CALL SYNCHRONIZATION

TECHNICAL FIELD

The present disclosure relates to the field of communication technology, and in particular, to a system and a method for automatic call synchronization.

BACKGROUND

With development of communication technology, various communication means, such as a fixed terminal, a mobile terminal, have been widely spread in people's lives and works. However, there is radiation of electromagnetic waves during communication of the mobile terminal, which may cause disadvantageous effects on people's health if the mobile terminal is used for a long time. Places where the mobile terminal is used for communication are typically some fixed places such as home, or an office, these fixed places are generally provided with a fixed terminal. Currently, a call transfer between the mobile terminal and the fixed terminal may be implemented by actively set by a user. For example, a mobile terminal user who has enabled the call transfer function may set the fixed terminal number as a call transfer number when he is at home or office, and may answer by means of the fixed terminal when someone calls the mobile terminal of the called user. However, the current call transfer function has a lower degree of automation, and both enabling and disabling the call transfer function need to be set by the user with related operations of the user. When a position and an environment in which the user is located change, the call transfer number needs to be actively changed, which increases burdens of the user and significantly limits convenience and initiative in user's usage.

Therefore, a technical problem of how to improve the degree of automation of the call transfer function so as to bring convenience to the user's usage is desired to be solved by the skilled in the art.

SUMMARY

In view of the foregoing, embodiments of the present disclosure provide a system and a method for automatic call synchronization, in order to improve a degree of automation of a call synchronization function.

Therefore, an embodiment of the present disclosure provides a system for automatic call synchronization, comprising: a wireless signal transponder, at least one mobile terminal having a wireless communication module, a fixed terminal having a wireless communication module, and a mode recognition unit connected to the wireless signal transponder, wherein the mobile terminal is configured to transmit, to the wireless signal transponder, a call synchronization request which carries identification information and call information of the mobile terminal, when the mobile terminal receives a called signal from a calling mobile terminal and determines that an automatic call synchronization function is enabled by itself;

the mode recognition unit is configured to perform an authentication on the mobile terminal according to the identification information of the mobile terminal, after receiving the call synchronization request forwarded by the wireless signal transponder; and transmit a call access request which carries the identification information and the call information of the mobile terminal to the fixed terminal via the wireless signal transponder, after the authentication on the mobile terminal is passed;

the fixed terminal is configured to notify the user of the mobile terminal that there is a call according to the identification information and the call information of the mobile terminal, after receiving the call access request; and transmit a call access response to the wireless signal transponder when it is determined that the user of the mobile terminal answers the call with the fixed terminal, and complete communication for the call over a network connected between the calling mobile terminal and the fixed terminal.

In a possible implementation, in the automatic call synchronization system provided by an embodiment of the present disclosure, when it is determined that the user of the mobile terminal answers the call with the mobile terminal, the mobile terminal transmits the call access request which carries the identification information of the mobile terminal to the mode recognition unit via the wireless signal transponder; and after the mode recognition unit receives the call access response forwarded by the wireless signal transponder and the call access request of the mobile terminal, the mode recognition unit performs the authentication on the mobile terminal according to the identification information of the mobile terminal; and after the authentication on the mobile terminal is passed, a communication channel between the mobile terminal and the fixed terminal is established by the wireless signal transponder.

In a possible implementation, in the automatic call synchronization system provided by an embodiment of the present disclosure, the mode recognition unit is further configured to determine whether the mobile terminal is located in a coverage of a wireless network of the wireless signal transponder; and if so, transmit an instruction of enabling the automatic call synchronization function to the mobile terminal and the fixed terminal respectively via the wireless signal transponder.

In a possible implementation, in the automatic call synchronization system provided by an embodiment of the present disclosure, the mode recognition unit is configured to obtain the identification information of the mobile terminal via the wireless signal transponder, when it is determined that the mobile terminal is located in the coverage of the wireless network of the wireless signal transponder; and transmit the instruction of enabling the automatic call synchronization function to the mobile terminal and the fixed terminal respectively via the wireless signal transponder, after the authentication on the mobile terminal is passed.

In a possible implementation, in the automatic call synchronization system provided by an embodiment of the present disclosure, the mobile terminal is further configured to disable the automatic call synchronization function, after it is determined that the mobile terminal leaves the coverage of the wireless network of the wireless signal transponder.

In a possible implementation, in the automatic call synchronization system provided by an embodiment of the present disclosure, the mode recognition unit is further configured to determine whether the mobile terminal is within the coverage of the wireless network of the wireless signal transponder; if so, transmit an instruction of disabling the automatic call synchronization function to the fixed terminal via the wireless signal transponder.

In a possible implementation, in the automatic call synchronization system provided by an embodiment of the present disclosure, the fixed terminal has a voice playing module and/or a display module; the fixed terminal is configured to play and/or display information on calling the user of the mobile terminal by the voice calling module and/or the display module.

In a possible implementation, in the automatic call synchronization system provided by an embodiment of the present disclosure, the fixed terminal has a display module;

the mode recognition unit is further configured to receive, by the wireless signal transponder, an addressing request which carries the identification information of the mobile terminal and is transmitted by the fixed terminal, via the wireless signal transponder; perform the authentication on the mobile terminal according to the identification information of the mobile terminal; and transmit a request for obtaining addressing information to the corresponding mobile terminal via the wireless signal transponder, after the authentication on the mobile terminal is passed;

the mobile terminal is further configured to transmit, via the wireless signal transponder, corresponding stored information to the display module of the fixed terminal for display, after receiving the request for obtaining addressing information which is forwarded by the wireless signal transponder.

In a possible implementation, in the automatic call synchronization system provided by an embodiment of the present disclosure, the mode recognition unit and the wireless signal transponder are integrated in the fixed terminal.

In a possible implementation, in the automatic call synchronization system provided by an embodiment of the present disclosure, the mode recognition unit is integrated in the wireless signal transponder.

An embodiment of the present disclosure further provides an automatic call synchronization method, comprising:

transmitting, by a mobile terminal, a call synchronization request which carries identification information and call information of the mobile terminal to the wireless signal transponder which is connected to the mode recognition unit, when the mobile terminal receives a called signal from a calling mobile terminal and determines that an automatic call synchronization function is enabled by itself;

performing, by a mode recognition unit, an authentication on the mobile terminal according to the identification information of the mobile terminal, after the mode recognition unit receives the call synchronization request forwarded by the wireless signal transponder; and transmitting a call access request which carries the identification information and the call information of the mobile terminal to the fixed terminal via the wireless signal transponder, after the authentication on the mobile terminal is passed;

calling, by the fixed terminal, a user of the calling mobile terminal of the mobile terminal according to the identification information and the call information of the mobile terminal, after the fixed terminal receives the call access request; and transmitting, by the fixed terminal, a call access response to the wireless signal transponder when it is determined that the user of the mobile terminal answers the call with the fixed terminal, and completing communication for the call over a network connected between the calling mobile terminal and the fixed terminal.

In a possible implementation, the automatic call synchronization method provided by an embodiment of the present disclosure further comprises:

transmitting, by the mobile terminal, the call access request which carries the identification information of the mobile terminal to the mode recognition unit via the wireless signal transponder, when it is determined that the user of the mobile terminal answers the call with the mobile terminal;

performing, by the mode recognition unit, the authentication on the mobile terminal according to the identification information of the mobile terminal, after the mode recognition unit receives the call access response forwarded by the wireless signal transponder and the call access request of the mobile terminal; and establishing a communication channel between the mobile terminal and the fixed terminal by the wireless signal transponder, after the authentication on the mobile terminal is passed.

In a possible implementation, the automatic call synchronization method provided by an embodiment of the present disclosure further comprises:

determining, by the mode recognition unit, whether the mobile terminal is located in a coverage of a wireless network of the wireless signal transponder; and if so, transmitting an instruction of enabling the automatic call synchronization function to the mobile terminal and the fixed terminal respectively via the wireless signal transponder.

In a possible implementation, the automatic call synchronization method provided by an embodiment of the present disclosure particularly comprises:

obtaining, by the mode recognition unit, the identification information of the mobile terminal via the wireless signal transponder, when the mode recognition unit determines that the mobile terminal is located in the coverage of the wireless network of the wireless signal transponder; and transmitting the instruction of enabling the automatic call synchronization function to the mobile terminal and the fixed terminal respectively via the wireless signal transponder, after the authentication on the mobile terminal is passed.

In a possible implementation, the automatic call synchronization method provided by an embodiment of the present disclosure further comprises:

disabling, by the mobile terminal, the automatic call synchronization function, after it is determined that the mobile terminal leaves the coverage of the wireless network of the wireless signal transponder.

In a possible implementation, the automatic call synchronization method provided by an embodiment of the present disclosure further comprises:

determining, by the mode recognition unit, whether the mobile terminal is within the coverage of the wireless network of the wireless signal transponder; if so, transmitting an instruction of disabling the automatic call synchronization function to the fixed terminal via the wireless signal transponder.

In a possible implementation, the automatic call synchronization method provided by an embodiment of the present disclosure further comprises:

receiving, by the mode recognition unit, an addressing request which carries the identification information of the mobile terminal and is transmitted by the fixed terminal, via the wireless signal transponder; performing the authentication on the mobile terminal according to the identification information of the mobile terminal; and transmitting a request for obtaining addressing information to the corresponding mobile terminal via the wireless signal transponder, after the authentication on the mobile terminal is passed;

transmitting, by the mobile terminal, corresponding stored information to the display module of the fixed terminal for display via the wireless signal transponder, after the mobile terminal receives the request for obtaining addressing information which is forwarded by the wireless signal transponder.

The automatic call synchronization system provided by the embodiments of the present disclosure as described above may automatically synchronize the called signal to the fixed terminal when the mobile terminal receives the called signal, so that the user may selectively use the mobile terminal and/or the fixed terminal for answering the call, which brings convenience to the user when answering the call, and improves the degree of automation of the call synchronization function; and the communication for the call may be completed by the network to which the fixed terminal is connected during the user is answering the call, which may also save phone charge.

DETAILED DESCRIPTION

Hereinafter, a system and a method for automatic call synchronization provided by the embodiments of the present disclosure will be described in detail with reference to the drawings.

Figure 1:
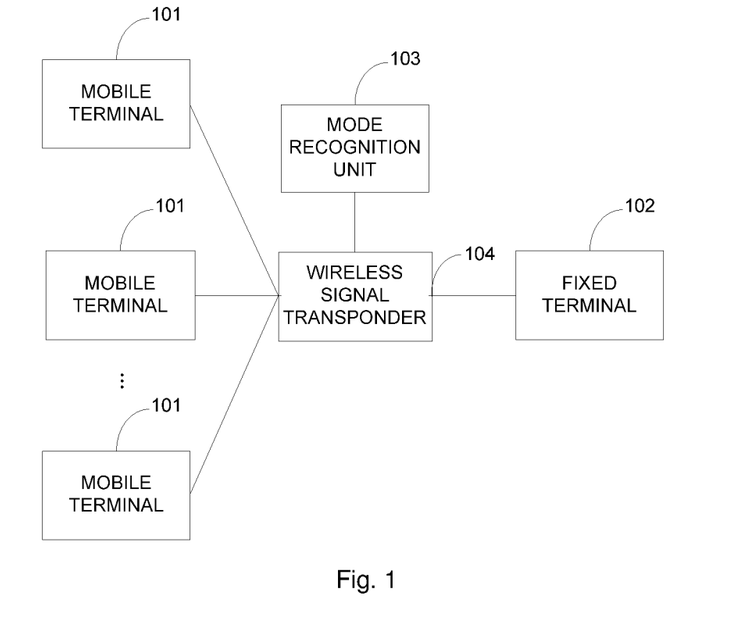
FIG. 1 shows a schematic structure diagram of an automatic call synchronization system according to a first embodiment of the present disclosure.

An embodiment of the present disclosure provides an automatic call synchronization system. As shown in FIG. 1, the automatic call synchronization system comprises: at least one mobile terminal 101 having a wireless communication module, a fixed terminal 102 having a wireless communication module, a mode recognition unit 103, and a wireless signal transponder 104 connected to the mode recognition unit 103, wherein the mobile terminal 101 is configured to transmit, to the wireless signal transponder 104, a call synchronization request which carries identification information and call information of the mobile terminal 101, when the mobile terminal 101 receives a called signal from a calling mobile terminal and determines that an automatic call synchronization function is enabled by itself;

the mode recognition unit 103 is configured to perform an authentication on the mobile terminal 101 according to the identification information of the mobile terminal 101, after receiving the call synchronization request forwarded by the wireless signal transponder 104; and transmit a call access request which carries the identification information and the call information of the mobile terminal 101 to the fixed terminal 102 via the wireless signal transponder 104, after the authentication on the mobile terminal 101 is passed;

the fixed terminal 102 is configured to notify the user of the mobile terminal 101 that there is a call, according to the identification information and the call information of the mobile terminal 101, after receiving the call access request; and transmit a call access response to the wireless signal transponder 104 when it is determined that the user of the mobile terminal 101 uses the fixed terminal 102 to answer the call, and complete communication for the call over a network connected between the wireless signal transponder 104 and the fixed terminal 102.

The automatic call synchronization system provided by the embodiment of the present disclosure as described above may automatically synchronize the called signal to the fixed terminal when the mobile terminal receives the called signal, so that the user may selectively use the mobile terminal and/or the fixed terminal for answering the call, which brings convenience to the user when answering the call, and improves the degree of automation of the call synchronization function; and the communication for the call may be completed by the network to which the fixed terminal is connected during the user is answering the call, which may also save phone charge.

In a particular implementation, the identification information carried in the call synchronization request which is transmitted by the mobile terminal 101 to the mode recognition unit 103 may particularly be information such as ID information of the mobile terminal 101 or number information of the user, and the call information may particularly be information such as a name, number information of a calling user. After the mode recognition unit 103 receives the call synchronization request which is transmitted by the mobile terminal 101 and forwarded by the wireless signal transponder 104, the mode recognition unit 103 may calculate and match between the corresponding identification information transmitted by the mobile terminal 101 and database information of its own; if the match is successful, the authentication on the mobile terminal 101 is passed; and then may transmit the call access request to the fixed terminal 102 via the wireless signal transponder 104.

In a particular implementation, in the above automatic call synchronization system provided by the embodiment of the present disclosure, in order that the fixed terminal 102 can accurately call the user of the corresponding mobile terminal 101 after it receives the call access request, the fixed terminal generally has a voice playing module and/or a display module. In particular, the fixed terminal 102 may notify the user of the mobile terminal 101 that there is a call by means of the voice playing module and/or the display module. For example, when San ZHANG calls the mobile terminal of Si LI, and the fixed terminal receives the call access request, the fixed terminal may prompt by the voice playing module with languages that a phone number of San ZHANG is calling a mobile terminal number, name or other information of Si LI, and may also display that a mobile terminal number, name or other information of San ZHANG is calling Si LI on a display screen of the fixed terminal by the display module, which may convenient for Si LI to confirm that his mobile terminal receives the call access request. The calling using the calling number and the name of the called party is only described for illustration, and other approaches may also be used for calling in practical implementations, which are not limited here.

Further, in the above automatic call synchronization system provided by the embodiment of the present disclosure, when the user is called by the calling party, the call may be answered by the user with either the fixed terminal or the mobile terminal. In the conventional technical solutions, when the user alternatively selects either the fixed terminal or the mobile terminal for answering the call, the remaining terminal cannot access to the communication of the call.

However, the above automatic call synchronization system provide by the embodiment of the present disclosure may implement three-party communication among the mobile terminal 101, the fixed terminal 102 and the calling party simultaneously, i.e., after the user answers the call with the fixed terminal 102, the mobile terminal 101 may also transmit the call access request which carries the identification information of the mobile terminal 101 to the mode recognition unit 103 via the wireless signal transponder 104, when it is determined that the user answer the call with the mobile terminal; the mode recognition unit 103 may also perform the authentication on the mobile terminal 101 according to the identification information of the mobile terminal 101, after receiving the call access response forwarded by the wireless signal transponder 104 and the call access request transmitted by the mobile terminal 101; and may establish the communication channel between the mobile terminal 101 and the fixed terminal 102 via the wireless signal transponder 104 after the authentication on the mobile terminal 101 is passed. As such, the three-party communication may be implemented synchronously.

It should be noted that during the three-party communication, the communication with the calling party is actually implemented over networks to which the fixed terminal 102 is connected; and the communication between the calling party and the mobile terminal 101 is completed by communicating, over a wireless network between the calling mobile terminal and the fixed terminal 102, to the fixed terminal 102 and then over a network connected between the fixed terminal 102 and the mobile terminal 101 via the wireless signal transponder 104. Therefore, there is actually no direct communication channel being established between the mobile terminal 101 and the calling party, and thus no phone charge will be increased.

In a particular implementation, the above automatic call synchronization system provided by the embodiment of the present disclosure further has a function of automatically controlling the mobile terminal 101 and the fixed terminal 102 to enable the automatic call synchronization function. In particular, the mode recognition unit 103 is further configured to determine whether the mobile terminal 101 is located in a coverage of a wireless network of the wireless signal transponder 104; and if so, transmit an instruction of enabling the automatic call synchronization function to the mobile terminal 101 and the fixed terminal 102 respectively via the wireless signal transponder 104. As such, when the mobile terminal 101 is located within the coverage of the wireless network of the wireless signal transponder 104, the mobile terminal 101 and the fixed terminal 102 may enable the automatic call synchronization function for facilitating implementation of the call automatic synchronization function subsequently.

Further, in a particular implementation of the above automatic call synchronization system provided by the embodiment of the present disclosure, in order to ensure security of the wireless network of the wireless signal transponder 104, the mode recognition unit 103 may further authenticate the mobile terminal 101 before transmitting the instruction of enabling the automatic call synchronization function to the mobile terminal 101 and the fixed terminal 102 respectively via the wireless signal transponder 104, excluding mobile terminals which are not registered in the wireless network. In particular, the mode recognition unit 103 is configured to obtain the identification information of the mobile terminal 101 via the wireless signal transponder 104, when it is determined that the mobile terminal is located in the coverage of the wireless network of the wireless signal transponder 104; and transmit the instruction of enabling the automatic call synchronization function to the mobile terminal and the fixed terminal respectively via the wireless signal transponder 104, after the authentication on the mobile terminal 101 is passed. As such, the instruction of enabling the automatic call synchronization function being transmitted after the authentication is performed by the mode recognition unit 103 on the mobile terminal 101 may enhance the security of the wireless network.

In a particular implementation, there may be various approaches for the mode recognition unit 103 to determine whether the mobile terminal 101 is located in the coverage of the wireless network of the wireless signal transponder 104. For example, an apparatus, such as a signal sensor, for monitoring whether the user carrying the mobile terminal 101 enters a room in which the wireless signal transponder 104 and the mode recognition unit 103 are located may be arranged at an entrance of the room. If the user enters the room, the mode recognition unit 103 which is connected to the signal sensor may regard the mobile terminal 101 as being located within the coverage of the wireless network of the wireless signal transponder 104; and then may transmit the instruction of enabling the automatic call synchronization function to the mobile terminal 101 and the fixed terminal 102 respectively via the wireless signal transponder 104. For another example, the wireless signal transponder 104 which is connected to the mode recognition unit 103 may transmit a wireless signal out every set second(s); when the mobile terminal 101 enters the coverage of the wireless network of the wireless signal transponder 104, the mobile terminal 101 transmits a feedback signal back after it receives the wireless signal; after the feedback signal is received by the mode recognition unit 103, the mode recognition unit 103 transmits the instruction of enabling the automatic call synchronization function to the mobile terminal 101 and the fixed terminal 102 respectively via the wireless signal transponder 104.

In a particular implementation, in the above automatic call synchronization system provided by the embodiment of the present disclosure, the mobile terminal 101 is further configured to disable the automatic call synchronization function, after it is determined that the mobile terminal 101 leaves the coverage of the wireless network of the wireless signal transponder 104. As such, when the mobile terminal 101 leaves the coverage of the wireless network of the wireless signal transponder 104, the mobile terminal 101 disables the automatic call synchronization function; and when the mobile terminal 101 receives the called signal, the mobile terminal 101 would not transmit the call synchronization request to the mode recognition unit 103. This reduces trouble and provides convenience, compared to the conventional technical solution in which the user needs to cancel his setting actively.

In a particular implementation, in the above automatic call synchronization system provided by the embodiment of the present disclosure, the mode recognition unit 103 is further configured to determine whether the mobile terminal 101 is within the coverage of the wireless network of the wireless signal transponder 104; if so, transmit the instruction of disabling the automatic call synchronization function to the fixed terminal via the wireless signal transponder 104.

In a particular implementation, the above automatic call synchronization system provided by the embodiment of the present disclosure may further implement a function of calling a phone number stored in the mobile terminal using the fixed terminal. In particular, in order to facilitate the user to find the phone number stored in the mobile terminal so as to actively place a call conveniently, the fixed terminal 102 generally has a display module, and the user may transmit a request for addressing a specific mobile terminal 101 to the mode recognition unit 103 by the fixed terminal. For example, after the user may trigger a button on the fixed terminal 102 which matches a certain mobile terminal 101, the fixed terminal 102 may transmit the addressing request which carries the identification information of the mobile terminal 101 to the wireless signal transponder 104. After the wireless signal transponder 104 receives the addressing request which carries the identification information of the mobile terminal 101 transmitted by the fixed terminal 102, the wireless signal transponder 104 forwards the addressing request to the mode recognition 103 for authentication. In particular, the mode recognition unit 103 is further configured to receive, via the wireless signal transponder 104, the address request which carries the identification information of the mobile terminal 101 transmitted by the fixed terminal 102; performs the authentication on the mobile terminal 101 according to the identification information of the mobile terminal 101; and transmits a request for obtaining addressing information to the corresponding mobile terminal via the wireless signal transponder 104, after the authentication on the mobile terminal is passed. In particular, the process of the mode recognition unit 103 performing the authentication on the mobile terminal 101 comprises: calculating and matching, by the mode recognition unit 103, between the information of the addressing request and the database information of its own; if the match is successful, the authentication on the mobile terminal 101 is passed. The mobile terminal 101 is further configured to transmit, by the mode recognition unit, the corresponding stored information to the fixed terminal for display, after the mobile terminal receives the request for obtaining addressing information which is forwarded by the wireless signal transponder 104. As such, the user may actively call the phone number stored in the mobile terminal 101 by operations on the fixed terminal 102. The corresponding information stored in the mobile terminal 101 may include contacts, short messages, browsing webpages and the like, which are not limited here.

For example, if San ZHANG needs to call the mobile terminal of Si LI, San ZHANG may use the fixed terminal to transmit the addressing request which carries ID information of the mobile terminal of San ZHANG to the wireless signal transponder; the wireless signal transponder transmits the addressing request to the mode recognition unit; the mode recognition unit begins to perform ID authentication on the mobile terminal of San ZHANG; after the ID authentication on the mobile terminal is passed, the mode recognition unit notifies the wireless signal transponder of transmitting the request for obtaining addressing information to the identified mobile terminal with the ID information. After the mobile terminal of San ZHANG receives the request for obtaining addressing information, the mobile terminal of San ZHANG transmits the stored information containing the mobile terminal number of Si LI to the fixed terminal via the wireless signal transponder to be displayed for San ZHANG; then, San ZHANG may use the fixed terminal to actively call the mobile terminal of Si LI according to the phone number displayed on the display screen.

Figure 2:
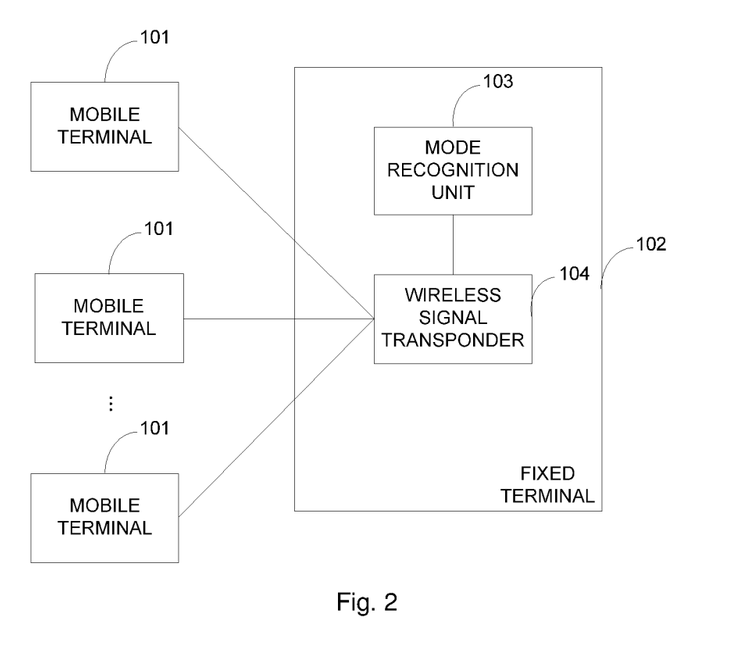
FIG. 2 shows a schematic structure diagram of an automatic call synchronization system according to a second embodiment of the present disclosure.
Figure 3:
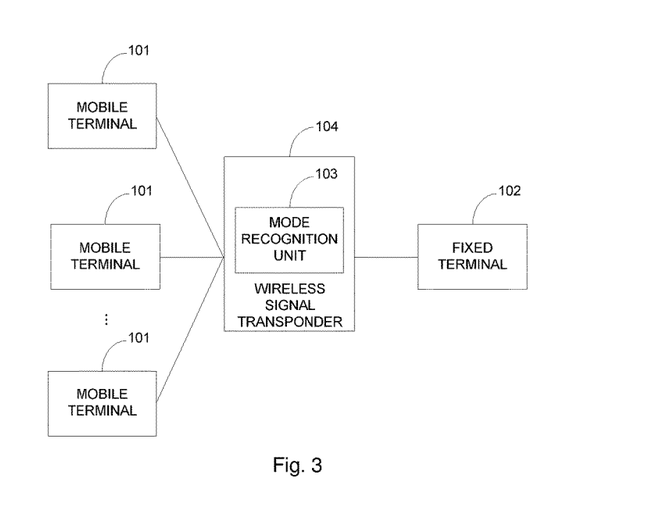
FIG. 3 shows a schematic structure diagram of an automatic call synchronization system according to a third embodiment of the present disclosure.

In a particular implementation, there are various ways of integrating the mode recognition unit 103 and the wireless signal transponder 104 in the above automatic call synchronization system provided by the embodiment of the present disclosure. For example, as shown in FIG. 2, the mode recognition unit 103 and the wireless signal transponder 104 may be integrated in the fixed terminal 102, which may improve an integration level between the devices, and may reduce space occupied by the devices. For another example, as shown in FIG. 3, the mode recognition unit 103 may be integrated in the wireless signal transponder 104, and the wireless signal transponder 104 and the fixed terminal 102 may be designed separately.

Hereinafter, approaches of implementing automatic call synchronization by the automatic call synchronization system provided by the embodiment of the present disclosure will be illustrated in detail in connection with three particular examples.

First Example

Figure 4:
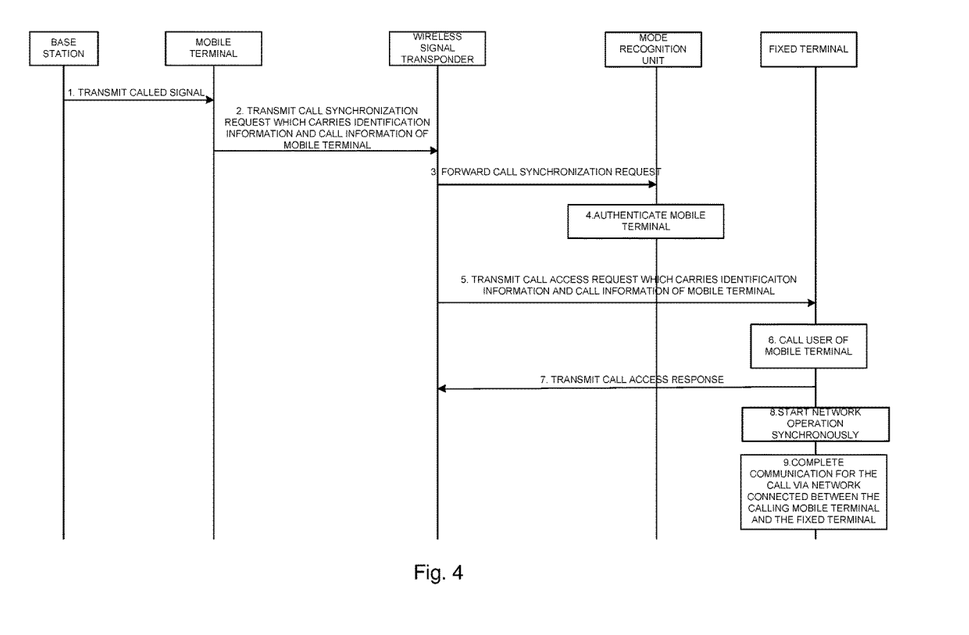
FIG. 4 shows a first signaling sequence of an automatic call synchronization system according to an embodiment of the present disclosure.

As shown in FIG. 4, particular steps of implementing automatic call synchronization comprises:

1. transmitting, by a base station, the called signal to the mobile terminal;

2. when the mobile terminal receives the called signal and determines that the automatic call synchronization function is enabled by itself, transmitting, by the mobile terminal, the call synchronization request which carries identification information and call information of the mobile terminal to the wireless signal transponder;

3. forwarding, by the wireless signal transponder, the call synchronization request to the mode recognition unit;

4. performing, by the mode recognition unit, authentication on the mobile terminal according to the identification information of the mobile terminal;

particularly, the approaches of authentication on the mobile terminal may be common authentication approaches, e.g., by directly comparing the identification information of the mobile terminal and identification information stored in the database of the mode recognition unit to determine whether they are matched or not. There may be various authentication approaches, which are not limited here.

5. transmitting, by the mode recognition unit, the call access request which carries the identification information and the call information of the mobile terminal to the fixed terminal via the wireless signal transponder, after the authentication on the mobile terminal is passed;

6. calling, by the fixed terminal, the user of the calling mobile terminal of the mobile terminal according to the identification information and the call information of the mobile terminal;

7. when it is determined that the user of the mobile terminal answers the call with the fixed terminal, transmitting, by the fixed terminal, a call access response to the wireless signal transponder;

8. Starting network operation of the fixed terminal synchronously; here, the network operation of the fixed terminal referring to a fixed communication network of the fixed terminal, which may be a wired telephone network of a fixed telephone;

9. completing, by the fixed terminal, communication for the call via the fixed telephone network to which the fixed terminal is connected.

As such, the automatic call synchronization function is implemented by the above steps 1-9 provided in the first example. By answering the call with the fixed terminal, the phone charge may be saved.

Second Example

Figure 5:
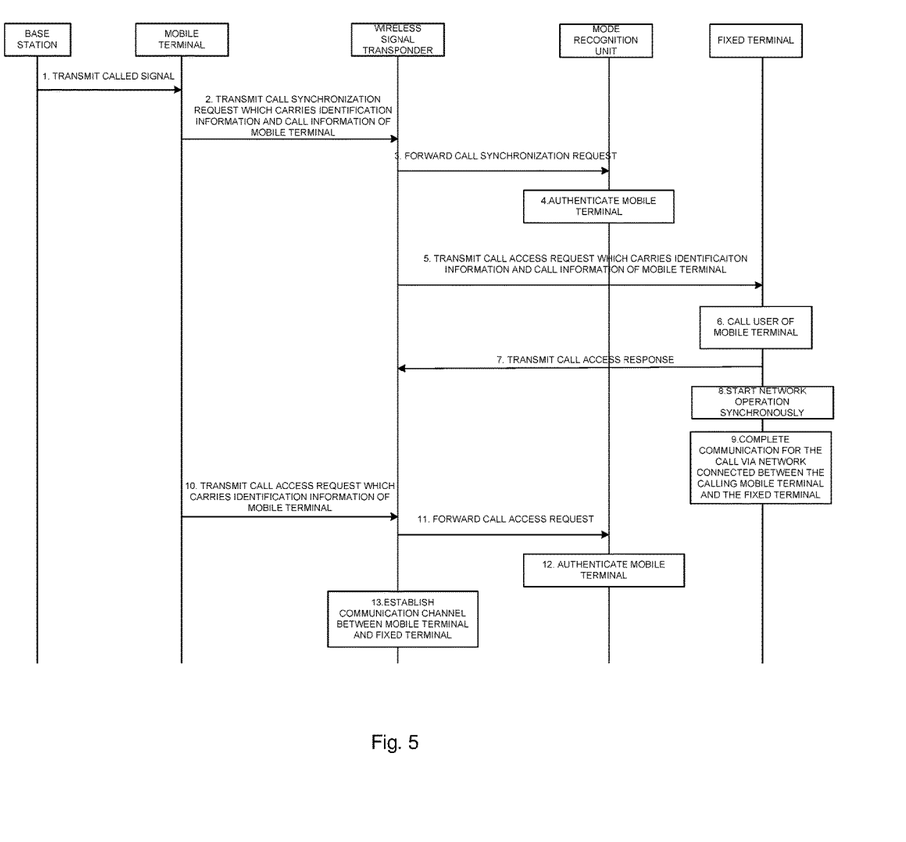
FIG. 5 shows a second signaling sequence of an automatic call synchronization system according to an embodiment of the present disclosure.

As shown in FIG. 5, particular steps of implementing automatic call synchronization comprises:

steps 1 to 9, which are completely identical with those in the first example and the descriptions thereof are omitted for simplicity.

After the fixed terminal completes the communication for the call via the network to which the fixed terminal is connected, following particular steps may be performed:

10. after it is determined that the user answers the call with the mobile terminal, transmitting, by the mobile terminal, the call access request which carries the identification information of the mobile terminal to the wireless signal transponder;

11. forwarding, by the wireless signal transponder, the call access request to the mode recognition unit;

12. performing, by the mode recognition unit, the authentication on the mobile terminal according to the identification information of the mobile terminal;

13. establishing, by the wireless signal transponder, the communication channel between the mobile terminal and the fixed terminal, after the authentication on the mobile terminal is passed.

As such, the three-party communication function may be implemented by the above steps 1-13 provided by the second example.

Third Example

Figure 6:
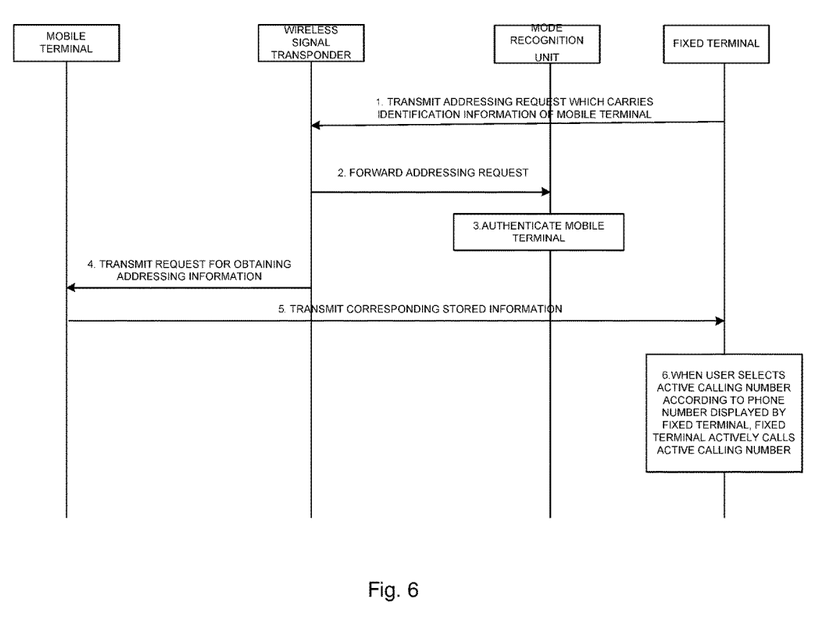
FIG. 6 shows a third signaling sequence of an automatic call synchronization system according to an embodiment of the present disclosure.

As shown in FIG. 6, particular steps of implementing automatic call synchronization comprises:

1. transmitting, by the fixed terminal, an addressing request which carries the identification information of the mobile terminal to the wireless signal transponder;

2. forwarding, by the wireless signal transponder, the addressing request to the mode recognition unit;

3. performing, by the mode recognition unit, the authentication on the mobile terminal according to the identification information of the mobile terminal;

4. transmitting, by the mode recognition unit, the request for obtaining addressing information to the corresponding mobile terminal via the wireless signal transponder, after the authentication on the mobile terminal is passed;

5. transmitting, by the mobile terminal, corresponding stored information to the fixed terminal for display via the wireless signal transponder;

6. when the user selects an active calling number according to the phone number displayed by the fixed terminal, actively calling the active calling number by the fixed terminal.

As such, the active calling function of calling the phone number stored in the mobile terminal by the fixed terminal is implemented by the above steps 1-6 provided by the third example. Initiating the active call over the fixed terminal network of the fixed terminal may save the phone charge and/or provide convenient operations. It should be noted that sometimes possibly for more convenience, assuming that the user is located near the fixed terminal and does not carry the mobile terminal, the fixed terminal may be directly used for calling, avoiding operations of finding the mobile terminal.

Based on the same idea of the present disclosure, an embodiment of the present disclosure further provides an automatic call synchronization method. Since the principle of the method for solving the technical problem is similar with that of the automatic call synchronization system as previously described, implementations of the method may refer to the implementations of the system as previously discussed, and thus the descriptions thereof will be omitted for simplicity.

Figure 7:
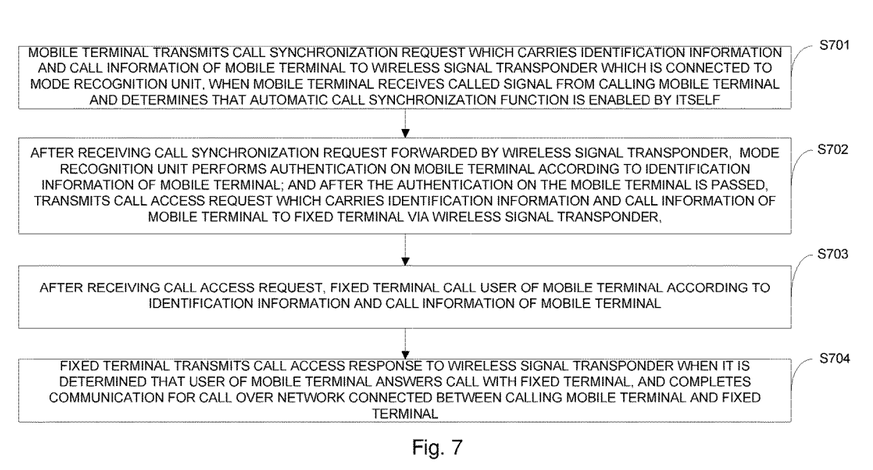
FIG. 7 shows a schematic flowchart of an automatic call synchronization method according to an embodiment of the present disclosure.

In particular, as shown in FIG. 7, the automatic call synchronization method provided by the embodiment of the present disclosure comprises:

step S701 of transmitting, by the mobile terminal, a call synchronization request which carries identification information and call information of the mobile terminal to the wireless signal transponder which is connected to the mode recognition unit, when the mobile terminal receives a called signal from a calling mobile terminal and determines that an automatic call synchronization function is enabled by itself;

step S702 of performing, by the mode recognition unit, an authentication on the mobile terminal according to the identification information of the mobile terminal, after the mode recognition unit receives the call synchronization request forwarded by the wireless signal transponder; and transmitting a call access request which carries the identification information and the call information of the mobile terminal to the fixed terminal via the wireless signal transponder, after the authentication on the mobile terminal is passed;

step S703 of calling, by the fixed terminal, a user of the mobile terminal according to the identification information and the call information of the mobile terminal, after the fixed terminal receives the call access request; and step S704 of transmitting, by the fixed terminal, a call access response to the wireless signal transponder when it is determined that the user of the mobile terminal answers the call with the fixed terminal, and completing communication for the call over a matched fixed telephone network operation connected between the calling mobile terminal and the fixed terminal.

In a possible implementation, the above automatic call synchronization method provided by the embodiment of the present disclosure further comprises:

transmitting, by the mobile terminal, the call access request which carries the identification information of the mobile terminal to the mode recognition unit via the wireless signal transponder, when it is determined that the user of the mobile terminal answers the call with the fixed terminal;

performing, by the mode recognition unit, the authentication on the mobile terminal according to the identification information of the mobile terminal, after the mode recognition unit receives the call access response forwarded by the wireless signal transponder and the call access request of the mobile terminal; and establishing a communication channel between the mobile terminal and the fixed terminal by the wireless signal transponder, after the authentication on the mobile terminal is passed.

In a possible implementation, the above automatic call synchronization method provided by the embodiment of the present disclosure further comprises:

determining, by the mode recognition unit, whether the mobile terminal is located in a coverage of a wireless network of the wireless signal transponder; and if so, transmitting an instruction of enabling the automatic call synchronization function to the mobile terminal and the fixed terminal respectively via the wireless signal transponder.

In a possible implementation, the above automatic call synchronization method provided by the embodiment of the present disclosure particularly comprises:

obtaining, by the mode recognition unit, the identification information of the mobile terminal via the wireless signal transponder, when the mode recognition unit determines that the mobile terminal is located in the coverage of the wireless network of the wireless signal transponder; and transmitting the instruction of enabling the automatic call synchronization function to the mobile terminal and the fixed terminal respectively via the wireless signal transponder, after the authentication on the mobile terminal is passed.

In a possible implementation, the above automatic call synchronization method provided by the embodiment of the present disclosure further comprises:

disabling, by the mobile terminal, the automatic call synchronization function, after it is determined that the mobile terminal leaves the coverage of the wireless network of the wireless signal transponder.

In a possible implementation, the above automatic call synchronization method provided by the embodiment of the present disclosure further comprises:

determining, by the mode recognition unit, whether the mobile terminal is within the coverage of the wireless network of the wireless signal transponder; if so, transmitting an instruction of disabling the automatic call synchronization function to the fixed terminal via the wireless signal transponder.

In a possible implementation, the above automatic call synchronization method provided by the embodiment of the present disclosure further comprises:

receiving, by the mode recognition unit, an addressing request which carries the identification information of the mobile terminal and is transmitted by the fixed terminal, via the wireless signal transponder; performing the authentication on the mobile terminal according to the identification information of the mobile terminal; and transmitting a request for obtaining addressing information to the corresponding mobile terminal via the wireless signal transponder, after the authentication on the mobile terminal is passed;

transmitting, by the mobile terminal, corresponding stored information to the display module of the fixed terminal via the wireless signal transponder, after the mobile terminal receives the request for obtaining addressing information which is forwarded by the wireless signal transponder.

By the above descriptions of the implementations, the skilled in the art may clearly understand that the embodiments of the present disclosure may be implemented by hardware, or by software in combination with a general hardware platform. Base on this, the technical solutions of the embodiments of the present disclosure may be embodied in software products, which may be stored in a non-volatile storage medium, such as CD-ROM, U-disk, mobile hard disk etc., and include several instructions, which when executed, cause the computer device, such as a personal computer, a server or a network device, to perform the methods according to various embodiments of the present disclosure.

It may be understood by the skilled in the art that the drawings are illustrative diagrams of preferred embodiments, and modules or processes in the drawings may not be necessary for implementing the present disclosure.

It may be understood by the skilled in the art that the modules of the device in the embodiments may be distributed in the device according to the description of the embodiments, or may be arranged in one or more devices in some variants which are different from the embodiments. The modules in the above embodiments may be integrated into one module, or may be further divided into a plurality of sub-modules.

The serial numbers of the above embodiments of the present disclosure are described for illustration only, but do not represent advantages and disadvantages of the embodiments.

The system and the method for automatic call synchronization are provided by the embodiments of the present disclosure. The system comprises: a wireless signal transponder, at least one mobile terminal having a wireless communication module, a fixed terminal having a wireless communication module, and a mode recognition unit connected to the wireless signal transponder, wherein the mobile terminal is configured to transmit, to the wireless signal transponder, a call synchronization request which carries identification information and call information of the mobile terminal, when the mobile terminal receives a called signal from a calling mobile terminal and determines that an automatic call synchronization function is enabled by itself; the mode recognition unit is configured to perform an authentication on the mobile terminal according to the identification information of the mobile terminal, after receiving the call synchronization request forwarded by the wireless signal transponder; and transmit a call access request which carries the identification information and the call information of the mobile terminal to the fixed terminal via the wireless signal transponder, after the authentication on the mobile terminal is passed; the fixed terminal is configured to call a user of the calling mobile terminal of the mobile terminal according to the identification information and the call information of the mobile terminal, after receiving the call access request; and transmit a call access response to the wireless signal transponder when it is determined that the user of the mobile terminal answers the call with the fixed terminal, and complete communication for the call over a network connected between the calling mobile terminal and the fixed terminal. The automatic call synchronization system provided by the embodiments of the present disclosure as described above may automatically synchronize the called signal to the fixed terminal when the mobile terminal receives the called signal, so that the user may selectively use the mobile terminal and/or the fixed terminal for answering the call, which brings convenience to the user when answering the call, and improves the degree of automation of the call synchronization function; and the communication for the call may be completed by the network to which the fixed terminal is connected during the user is answering the call, which may also save phone charge.

Obviously, various modifications and variations can be made by those skilled in the art based on the embodiments of the present disclosure without departing from the scope and spirit of the present disclosure. As such, provided that these modifications and variations belong to the scope of the claims of the present disclosure and their equivalents, these modifications and variations are intended to fall into the scope of the present disclosure.

We claim:

1. An automatic call synchronization system, comprising: a wireless signal transponder, at least one mobile terminal, a fixed terminal, and a mode recognition unit connected to the wireless signal transponder, wherein the mobile terminal is configured to transmit, to the wireless signal transponder, a call synchronization request which carries identification information and call information of the mobile terminal when the mobile terminal receives a called signal from a calling mobile terminal and determines that an automatic call synchronization function is enabled by itself;

the mode recognition unit is configured to authenticate the mobile terminal according to the identification information of the mobile terminal in response to receiving the call synchronization request forwarded by the wireless signal transponder, and transmit a call access request which carries the identification information and the call information of the mobile terminal to the fixed terminal via the wireless signal transponder when the mobile terminal is authenticated;

the fixed terminal is configured to notify a user of the mobile terminal that there is a call according to the identification information and the call information of the mobile terminal, in response to receiving the call access request, and transmit a call access response to the wireless signal transponder when it is determined that the user of the mobile terminal answers the call with the fixed terminal, and complete communication for the call over a network connected between the calling mobile terminal and the fixed terminal; and the mode recognition unit is further configured to, when the mobile terminal is located in a coverage area of a wireless network of the wireless signal transponder, receive an addressing request which carries the identification information of the mobile terminal and is transmitted by the fixed terminal via the wireless signal transponder, authenticate the mobile terminal according to the identification information of the mobile terminal, and transmit a request for obtaining addressing information to the corresponding mobile terminal via the wireless signal transponder when the mobile terminal is authenticated.

2. The automatic call synchronization system according to claim 1, wherein when it is determined that the user of the mobile terminal answers the call with the mobile terminal, the mobile terminal is configured to transmit the call access request which carries the identification information of the mobile terminal to the mode recognition unit via the wireless signal transponder; and wherein when the mode recognition unit receives the call access response forwarded by the wireless signal transponder and the call access request of the mobile terminal, the mode recognition unit is configured to authenticate the mobile terminal according to the identification information of the mobile terminal, and wherein when the mobile terminal is authenticated, a communication channel between the mobile terminal and the fixed terminal is established by the wireless signal transponder.

3. The automatic call synchronization system according to claim 1, wherein the mode recognition unit is further configured to determine whether the mobile terminal is located in a coverage of a wireless network of the wireless signal transponder or not; and if so, to transmit an instruction of enabling the automatic call synchronization function to the mobile terminal and the fixed terminal respectively via the wireless signal transponder.

4. The automatic call synchronization system according to claim 3, wherein the mode recognition unit is configured to obtain the identification information of the mobile terminal via the wireless signal transponder when it is determined that the mobile terminal is located in the coverage of the wireless network of the wireless signal transponder, and transmit the instruction of enabling the automatic call synchronization function to the mobile terminal and the fixed terminal respectively via the wireless signal transponder, when the mobile terminal is authenticated.

5. The automatic call synchronization system according to claim 3, wherein the mobile terminal is further configured to disable the automatic call synchronization function when it is determined that the mobile terminal leaves the coverage of the wireless network of the wireless signal transponder.

6. The automatic call synchronization system according to claim 3, wherein the mode recognition unit is further configured to determine whether the mobile terminal is within the coverage of the wireless network of the wireless signal transponder or not; if not, to transmit an instruction of disabling the automatic call synchronization function to the fixed terminal via the wireless signal transponder.

7. The automatic call synchronization system according to claim 1, wherein the fixed terminal is further configured to display information on calling the user of the mobile terminal.

8. The automatic call synchronization system according to claim 1, wherein the mobile terminal is further configured to transmit, via the wireless signal transponder, corresponding stored information to the fixed terminal for displaying, in response to receiving the request for obtaining addressing information which is forwarded by the wireless signal transponder.

9. The automatic call synchronization system according to claim 1, wherein the mode recognition unit and the wireless signal transponder are integrated in the fixed terminal.

10. The automatic call synchronization system according to claim 1, wherein the mode recognition unit is integrated in the wireless signal transponder.

11. An automatic call synchronization method, comprising:

transmitting, by a mobile terminal, a call synchronization request which carries identification information and call information of the mobile terminal to a wireless signal transponder which is connected to a mode recognition unit, when the mobile terminal receives a called signal from a calling mobile terminal and determines that an automatic call synchronization function is enabled by itself;

authenticating, by the mode recognition unit, the mobile terminal according to the identification information of the mobile terminal when the mode recognition unit receives the call synchronization request forwarded by the wireless signal transponder;

transmitting, by the mode recognition unit, a call access request which carries the identification information and the call information of the mobile terminal to the fixed terminal via the wireless signal transponder when the mobile terminal is authenticated;

notifying, by the fixed terminal, a user of the mobile terminal that there is a call according to the identification information and the call information of the mobile terminal when the fixed terminal receives the call access request; and transmitting, by the fixed terminal, a call access response to the wireless signal transponder when it is determined that the user of the mobile terminal answers the call with the fixed terminal, and completing communication for the call over a network connected between the calling mobile terminal and the fixed terminal;

wherein authenticating the mobile terminal further comprises:

receiving, by the mode recognition unit, when the mobile terminal is located in a coverage area of a wireless network of the wireless signal transponder, an addressing request which carries the identification information of the mobile terminal and is transmitted by the fixed terminal, via the wireless signal transponder;

authenticating, by the mode recognition unit, the mobile terminal according to the identification information of the mobile terminal; and transmitting, by the mode recognition unit, a request for obtaining addressing information to the corresponding mobile terminal via the wireless signal transponder, when the mobile terminal is authenticated.

12. The automatic call synchronization method according to claim 11, further comprising:
transmitting, by the mobile terminal, the call access request which carries the identification information of the mobile terminal to the mode recognition unit via the wireless signal transponder, when it is determined that the user of the mobile terminal answers the call with the mobile terminal; and
authenticating, by the mode recognition unit, the mobile terminal according to the identification information of the mobile terminal, when the mode recognition unit receives the call access response forwarded by the wireless signal transponder and the call access request of the mobile terminal; and
establishing a communication channel between the mobile terminal and the fixed terminal by the wireless signal transponder, when the mobile terminal is authenticated.

13. The automatic call synchronization method according to claim 11, further comprising:
determining, by the mode recognition unit, whether the mobile terminal is located in a coverage of a wireless network of the wireless signal transponder or not; and if so, transmitting an instruction of enabling the automatic call synchronization function to the mobile terminal and the fixed terminal respectively via the wireless signal transponder.

14. The automatic call synchronization method according to claim 13, particularly comprising:
obtaining, by the mode recognition unit, the identification information of the mobile terminal via the wireless signal transponder, when the mode recognition unit determines that the mobile terminal is located in the coverage of the wireless network of the wireless signal transponder; and
transmitting the instruction of enabling the automatic call synchronization function to the mobile terminal and the fixed terminal respectively via the wireless signal transponder, when the mobile terminal is authenticated.

15. The automatic call synchronization method according to claim 13, further comprising:
disabling, by the mobile terminal, the automatic call synchronization function, when it is determined that the mobile terminal leaves the coverage of the wireless network of the wireless signal transponder.

16. The automatic call synchronization method according to claim 13, further comprising:
determining, by the mode recognition unit, whether the mobile terminal is within the coverage of the wireless network of the wireless signal transponder or not; if not, transmitting an instruction of disabling the automatic call synchronization function to the fixed terminal via the wireless signal transponder.

17. The automatic call synchronization method according to claim 11, further comprising:
transmitting, by the mobile terminal, corresponding stored information to the fixed terminal via the wireless signal transponder, when the mobile terminal receives the request for obtaining addressing information which is forwarded by the wireless signal transponder.

* * * * *